(12) United States Patent
Lee

(10) Patent No.: US 7,195,205 B1
(45) Date of Patent: Mar. 27, 2007

(54) PARACHUTE WITH SKIRT REEFING SYSTEM

(75) Inventor: Calvin K. Lee, Needham, MA (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 63 days.

(21) Appl. No.: 11/243,888

(22) Filed: Oct. 5, 2005

(51) Int. Cl.
B64D 17/52 (2006.01)

(52) U.S. Cl. ........................................ 244/149; 244/142

(58) Field of Classification Search ................ 244/142, 244/144, 143, 151 B, 147, 149, 150, 151 R, 244/152
See application file for complete search history.

(56) References Cited

U.S. PATENT DOCUMENTS

| 2,358,417 A | * | 9/1944 | Gregory et al. ............. 244/142 |
| 2,721,716 A | * | 10/1955 | Beadle ........................ 244/142 |
| 3,047,261 A | | 7/1962 | Bockelmann |
| 3,278,143 A | | 10/1966 | Engel |
| 3,408,026 A | * | 10/1968 | Kriesel ........................ 244/152 |
| 3,829,046 A | * | 8/1974 | Matsuo et al. ............... 244/152 |
| 4,540,145 A | | 9/1985 | Matsuo |
| 4,752,050 A | * | 6/1988 | Johnson ........................ 244/152 |
| 4,955,563 A | | 9/1990 | Lee |
| 5,205,517 A | | 4/1993 | Reuter |
| 5,209,436 A | | 5/1993 | Lee |
| 5,248,117 A | * | 9/1993 | Hennings ..................... 244/152 |
| 6,328,263 B1 | | 12/2001 | Benney |
| 2002/0179774 A1 | * | 12/2002 | Lee et al. .................... 244/142 |

* cited by examiner

Primary Examiner—Michelle Clement
Assistant Examiner—Benjamin P. Lee
(74) Attorney, Agent, or Firm—Vincent J. Ranucci

(57) ABSTRACT

A parachute system has a canopy, suspension lines that extend from the canopy skirt to a confluence point, and a center line that is attached to and between the apex of the canopy and the confluence point. A single reefing line cutter is attached to the center line and is activated after a predetermined amount of time has elapsed. A first reefing line extends through a first group of reefing rings wherein one end of the first reefing line is attached to the single reefing line cutter and the opposite end is attached to the canopy skirt at a first predetermined location. A second reefing line extends through a second group of reefing rings that is opposite the first group of reefing rings. The second reefing line has one end attached to the single reefing line cutter and an opposite end attached to the canopy skirt at a second predetermined location that is across from the first predetermined location. The canopy opens to an initial circumference that is determined by the summation of the lengths of the first and second reefing lines. When the reefing line cutter is activated, the reefing line cutter releases the first and second reefing lines so as to allow full inflation of the canopy.

14 Claims, 3 Drawing Sheets

PARACHUTE WITH SKIRT REEFING SYSTEM

STATEMENT OF GOVERNMENT INTEREST

The invention described herein may be manufactured and used by the U.S. Government for Governmental purposes without the payment of any royalties thereon.

BACKGROUND OF THE INVENTION

1. Field of the Invention

The present invention generally relates to a parachute with a skirt reefing system.

2. Description of the Related Art

Large cargo parachutes typically have diameters of about one hundred feet and are made of solid cloth. Due to the large amount of canopy fabric, the opening process of such relatively large cargo parachutes is typically controlled in order to allow the canopy to open in stages thereby ensuring proper and safe inflation. A common technique used to control the opening process of the canopy is skirt reefing. Skirt reefing involves the use of a reefing line or cord with a length that is less than the circumference of the canopy skirt when the canopy is fully opened. The reefing line is attached to the skirt by sliding it through the reefing rings permanently attached to the canopy skirt at each suspension line junction. During initial parachute opening, the skirt opens to a circumference defined by the length of the reefing line thereby controlling and retarding the opening process. After this initial stage of parachute opening, the reefing line is then cut by pyrotechnic cutters which have preset firing times. Once the reefing line is cut, the skirt is released and the canopy continues to open. Depending on the size of the canopy and the desired degree of control of the canopy opening process, multi-stage opening can be achieved with several sets of reefing lines and pyrotechnic cutters.

FIG. 1 illustrates a prior art parachute system. Four separate reefing lines 10, 12, 14 and 16 are attached to skirt 18 of canopy 20. This prior art parachute system utilizes pyrotechnic cutter 22, 24, 26 and 28. Reefing line 10 is connected to cutters 22 and 26. Reefing line 12 is connected to cutter 22 and 24. Reefing line 14 is connected to cutters 26 and 28. Reefing line 16 is connected to cutters 24 and 28. Suspension lines 29 are connected to skirt 18. For purposes of clarity, not all suspension lines 29 are completely shown. Each suspension line 29 is connected in tandem to corresponding riser 30. In order to increase the drag force, center line 32 is connected between apex 34 of canopy 20 and the confluence point 36 wherein all risers 30 meet. Center line 32 is symmetrically located with respect to skirt 18 and is spaced from skirt 18 by radius R. Lanyard 38 connects payload 40 to risers 30. During the opening of canopy 20, center line 32 is tightly extended due to the weight of the payload 40 and the high air pressure inside canopy 20. A disadvantage of such prior art skirt reefing technique is the relatively high cost resulting from the use of a plurality of pyrotechnic cutters. The cost of such pyrotechnic cutters has steadily increased over the years and such cost contributes to the overall annual cost of conducting many cargo airdrops. For example, the U.S. Department of Defense conducts several thousand cargo airdrops using clusters of cargo parachutes every year for military and humanitarian causes. Therefore, the accumulated cost for using so many pyrotechnic cutters on these cargo parachutes is very significant.

What is needed is a cargo parachute system with skirt reefing that is relatively more economical to implement.

SUMMARY OF THE INVENTION

In one aspect, the present invention is directed to a parachute system comprising a canopy having a skirt and an apex, a plurality of reefing rings attached to the skirt, and a plurality of suspension lines. Each suspension line has a first end attached to the skirt near a corresponding reefing ring and a second end opposite the first end. All of the second ends of the suspension lines are connected together to define a confluence point. The parachute system further comprises a center line that is attached to and between the apex of the canopy and the confluence point, and a single reefing line cutter that is attached to the center line. The single reefing line cutter is activated after a predetermined amount of time has elapsed. The parachute system further includes a first reefing line that extends through a first group of the plurality of reefing rings. The first reefing line has a first end attached to the single reefing line cutter and a second end attached to the skirt at a first predetermined location. The parachute system further includes a second reefing line that extends through a second group of the plurality of reefing rings. The second group of reefing rings is approximately opposite the first group of reefing rings. The second reefing line has a first end attached to the single reefing line cutter and a second end attached to the skirt at a second predetermined location that is across from the first predetermined location. When the parachute system is deployed, the canopy opens to an initial circumference determined by the summation of the lengths of the first and second reefing lines. When the single reefing line cutter is activated, the first and second reefing lines are released thereby allowing full inflation of the canopy.

In a related aspect, the present invention is directed to a parachute system having a canopy which has skirt and an apex. The parachute system further comprises a plurality of reefing rings attached to the skirt, and a plurality of suspension lines. Each suspension line has a first end attached to the skirt near a corresponding reefing ring and a second end opposite the first end. The parachute system further includes a plurality of risers. Each riser has a first end attached to the second end of a corresponding suspension line. Each riser includes a second end opposite the first end of the riser. All of the second ends of the risers are connected together to define a confluence point. The parachute system also includes a center line attached to and between the apex of the canopy and the confluence point, and a single reefing line cutter that is attached to the center line. The single reefing line cutter is activated after a predetermined amount of time has elapsed. The parachute system further includes a first reefing line that extends through a first group of the plurality of reefing rings. The first reefing line has a first end attached to the single reefing line cutter and a second end attached to the skirt at a first predetermined location. The parachute system further includes a second reefing line that extends through a second group of the plurality of reefing rings. The second group of reefing rings is approximately opposite the first group of reefing rings. The second reefing line has a first end that is attached to the single reefing line cutter and a second end that is attached to the skirt at a second predetermined location that is across from the first predetermined location. When the parachute system is deployed, the canopy opens to an initial circumference that is determined by the summation of the lengths of the first and second reefing lines. When the single reefing line cutter is activated, the first and second reefing lines are released thereby allowing full inflation of the canopy.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

Figure 2A:
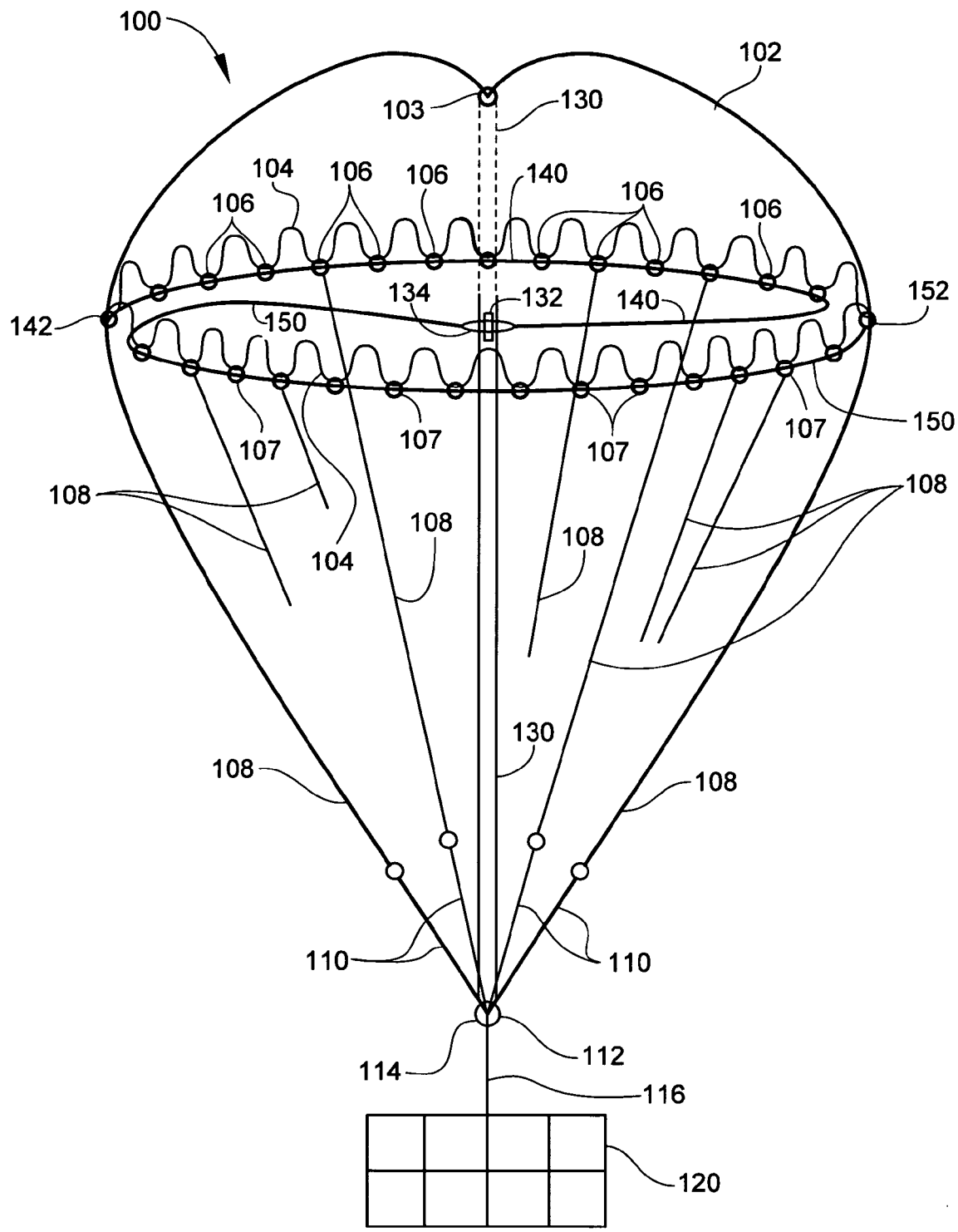
FIG. 2A is an elevational view of the parachute system of the present invention.
Figure 2B:
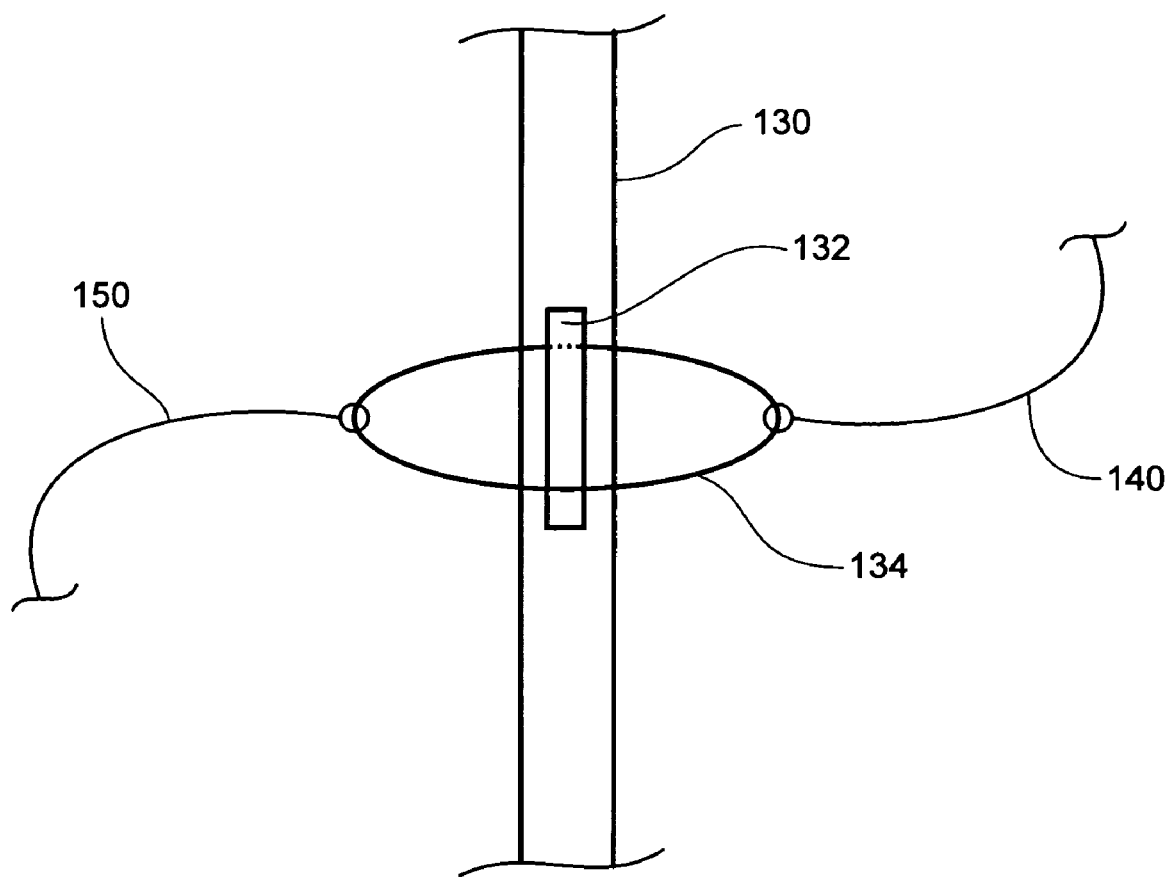
FIG. 2B is an enlarged view of a portion of the view of FIG. 2A.

Referring to FIGS. 2A and 2B, there is shown parachute system 100 of the present invention. Parachute system 100 generally comprises canopy 102 having apex 103 and skirt 104. Parachute system 100 further includes a first plurality of reefing rings 106 and a second plurality of reefing rings 107. Reefing rings 106 and 107 are attached to skirt 104. In a preferred embodiment, the reefing rings 107 are oppositely located with respect to reefing rings 106. Parachute system 100 includes a plurality of suspension lines 108. For purposes of clarity, some of the suspension lines 108 are either not shown or are only partially shown. Each suspension line 108 has a first end attached to skirt 104 near a corresponding reefing ring 106 or reefing ring 107. Each suspension line 108 also has a second end opposite its first end. In one embodiment, the second end of each suspension line 108 is attached to one end of a corresponding riser 110. The opposite ends of risers 110 are connected together at link 112 thereby defining confluence point 114. Lanyard 116 is connected to link 112 and payload 120. Parachute system 100 further includes center line 130 that is connected to apex 103 and link 112. As will be explained in the ensuing description, center line 130 remains generally centrally located with respect to canopy skirt 104 during the parachute opening process. Center line 130 has a diameter thickness that is capable of withstanding significant tension. In a preferred embodiment, center line 130 has a thickness of at least one inch. In a preferred embodiment, center line 130 is fabricated from heavy webbings to withstand the high tension forces. As shown in FIG. 2A, a single reefing line cutter 132 is attached to center line 130. Single reefing line cutter 132 is configured to be activated after a predetermined amount of time has elapsed. In one embodiment, reefing line cutter 132 is sewn to center line 130. In a preferred embodiment, reefing line cutter 132 is a pyrotechnic cutter having a built-in time delay.

As shown in FIG. 2B, line loop 134 is attached to reefing line cutter 132. Parachute system 100 further includes reefing line 140 that extends through reefing rings 106. Reefing line 140 has a first end attached to line loop 134 and a second end connected to skirt 104 at a first predetermined location 142. Parachute system 100 further comprises second reefing line 150 that extends through reefing rings 107. The second reefing line 150 has a first end attached to line loop 134 and a second end connected to skirt 104 at a second predetermined location 152 that is across from the first predetermined location 142. In a preferred embodiment, the first and second predetermined locations 142 and 152, respectively, are substantially diametrically positioned with respect to each other. In a preferred embodiment, single reefing line cutter 132 is positioned on center line 130 at a predetermined position so that when canopy 102 opens to an initial circumference prior to disreefing, single reefing line cutter 132 is at generally the same vertical level or position as are reefing lines 140 and 150. Stated another way, single reefing line cutter 132 is preferably positioned on center line 130 so that prior to disreefing, single reefing line cutter 132 is positioned neither above nor below reefing lines 140 and 150. Such a configuration facilitates the disreefing process.

Figure 1:
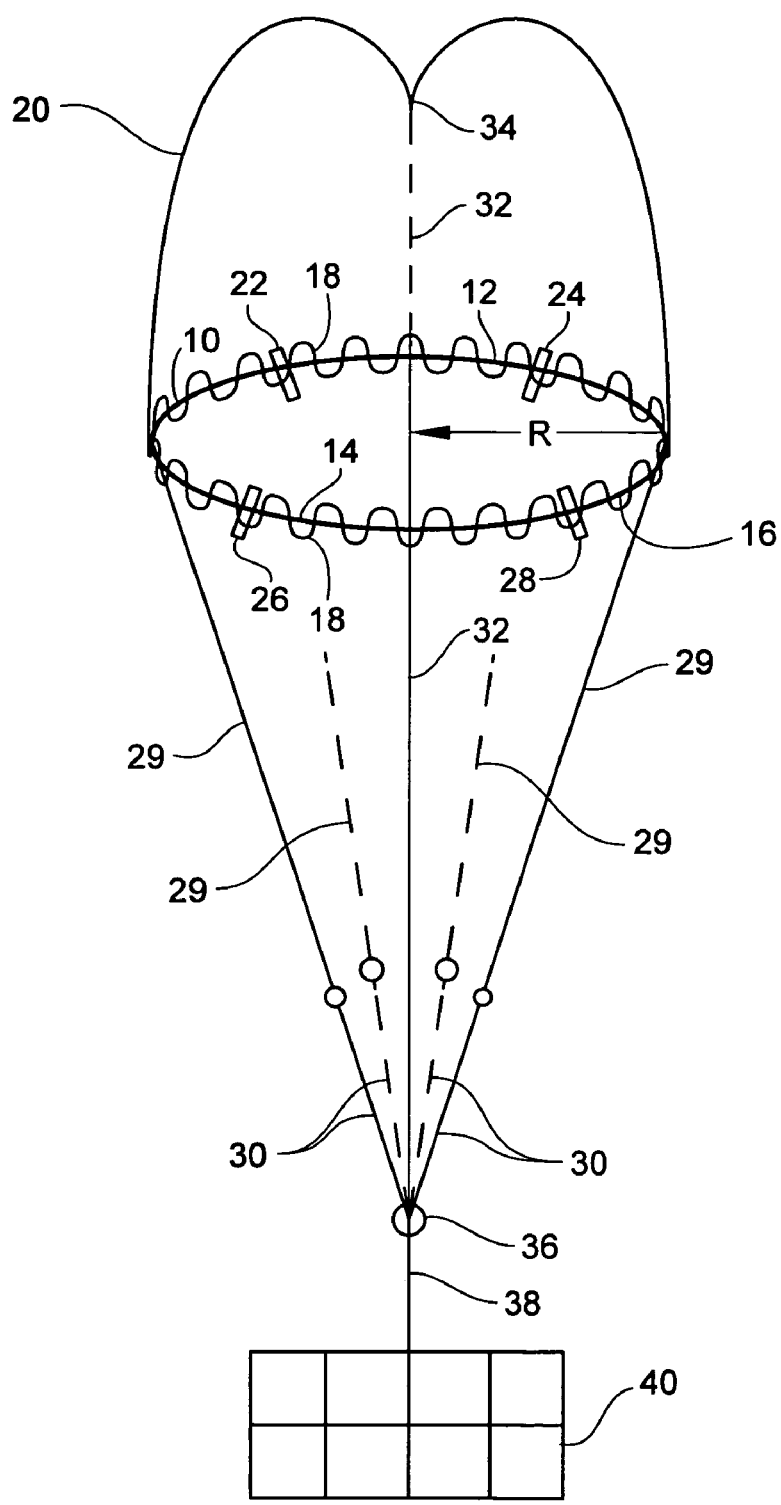
FIG. 1 is an elevational view of a prior art parachute system.

Referring to FIGS. 2A and 2B, during the opening process, there is a significant amount of tension on center line 130 thereby causing center line 130 to remain generally centrally located with respect to canopy skirt 104. Reefing lines 140 and 150 are of equal lengths. In one embodiment, reefing lines 140 and 150 are configured to have lengths that provide the same amount of skirt reefing as in the prior art parachute system shown in FIG. 1. In such a configuration, each reefing line 140 and 150 has a length that is equal to the summation of the lengths of reefing lines 10 and 12 and the radius R of the reefed skirt (see FIG. 1). Referring to FIGS. 2A and 2B, reefing line cutter 132 can be configured to have any desired delay time. In one embodiment, reefing line cutter 132 is configured to have a delay time that is the same as the delay time of the pyrotechnic cutters 22, 24, 26 and 28 used in the prior art parachute system shown in FIG. 1. In a preferred embodiment, line loop 134 is fabricated from the same material from which reefing lines 140 and 150 are fabricated.

Referring to FIGS. 2A and 2B, when reefing line cutter 132 is activated, it cuts line loop 134 so as to release reefing lines 140 and 150. When parachute system 100 is deployed (i.e. dropped from an aircraft), canopy 102 opens to an initial circumference. This initial circumference is less than the circumference of canopy skirt 104 when canopy 102 is fully inflated. Specifically, this initial circumference is determined by the sum of the lengths of reefing lines 140 and 150. When reefing line cutter 132 is activated, reefing line cutter 132 cuts line loop 134 thereby releasing reefing lines 140 and 150 and allowing full inflation of canopy 102.

Parachute system 100 provides several advantages over the prior art parachute systems. One advantage is that once reefing lines 140 and 150 are released, the opening process of canopy 102 is controlled, symmetrical and safe because center line 130 remains generally centrally located with respect to the canopy skirt 104. Another advantage of parachute system 100 is that it utilizes a single reefing line cutter 132 instead of a plurality of reefing line cutters thereby reducing costs and expense.

In an alternate embodiment, risers 110, shown in FIG. 2A, are not utilized. Instead, the ends of suspension lines 108 are directly connected to link 112.

The principles, preferred embodiments and modes of operation of the present invention have been described in the foregoing specification. This invention should not be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not limiting the scope and spirit of the invention as set forth in the attached claims.

What is claimed is:

1. A parachute system, comprising:
    a canopy having a skirt and an apex;
    a plurality of reefing rings attached to the skirt;
    a plurality of suspension lines, each suspension line having a first end attached to the skirt near a corresponding reefing ring and a second end opposite the first end, all of the second ends of the suspension lines being connected together to define a confluence point;

a center line attached to the apex of the canopy and the confluence point;

a single reefing line cutter that is attached to the center line and which is activated after a predetermined amount of time has elapsed;

a first reefing line extending through a first group of the plurality of reefing rings, the first reefing line having a first end attached to the single reefing line cutter and a second end attached to the skirt at a first predetermined location;

a second reefing line extending through a second group of the plurality of reefing rings, the second group of reefing rings being generally opposite the first group of reefing rings, the second reefing line having a first end attached to the single reefing line cutter and a second end attached to the skirt at a second predetermined location that is across from the first predetermined location; and whereby when the parachute system is deployed, the canopy opens to an initial circumference that is determined by the summation of the lengths of the first and second reefing lines and whereby when the single reefing line cutter is activated, the reefing line cutter releases the first and second reefing lines so as to allow full inflation of the canopy.

2. The parachute system according to claim 1 wherein the lengths of the first and second reefing lines are substantially the same.

3. The parachute system according to claim 1 wherein the first and second predetermined locations are substantially diametrically positioned with respect to each other.

4. The parachute system according to claim 1 wherein the single reefing line cutter is attached to the center line at a predetermined position such that when the canopy opens to the initial circumference, the single reefing line cutter is at generally the same vertical level or position as are the first and second reefing lines.

5. The parachute system according to claim 1 wherein the single reefing line cutter comprises a pyrotechnic cutter.

6. The parachute system according to claim 1 further including a line loop attached to the single reefing line cutter wherein the first ends of the first and second reefing lines are connected to the line loop and wherein the single reefing line cutter cuts the line loop when the single reefing line cutter is activated.

7. The parachute system according to claim 1 wherein the center line has a thickness of about one (1) inch.

8. A parachute system, comprising:
a canopy having a skirt and an apex;
a plurality of reefing rings attached to the skirt;
a plurality of suspension lines, each suspension line having a first end attached to the skirt near a corresponding reefing ring and a second end opposite the first end;

a plurality of risers, each riser having a first end attached to the second end of a corresponding suspension line, each riser including a second end opposite the first end of the riser, all of the second ends of the risers being connected together to define a confluence point;

a center line attached to and between the apex of the canopy and the confluence point;

a single reefing line cutter that is attached to the center line and which is activated after a predetermined amount of time has elapsed;

a first reefing line extending through a first group of the plurality of reefing rings, the first reefing line having a first end attached to the single reefing line cutter and a second end attached to the skirt at a first predetermined location;

a second reefing line extending through a second group of the plurality of reefing rings, the second group of reefing rings being opposite the first group of reefing rings, the second reefing line having a first end attached to the single reefing line cutter and a second end attached to the skirt at a second predetermined location that is across from the first predetermined location; and whereby when the parachute system is deployed, the canopy opens to an initial circumference that is determined by the summation of the lengths of the first and second reefing lines and whereby when the single reefing line cutter is activated, the single reefing line cutter releases the first and second reefing lines so as to allow full inflation of the canopy.

9. The parachute system according to claim 8 wherein the first reefing line has a first length and the second reefing line has a second length that is substantially the same as the first length.

10. The parachute system according to claim 8 wherein the single reefing line cutter is attached to the center line at a predetermined position such that when the canopy opens to the initial circumference, the single reefing line cutter is at generally the same vertical level or position as are the first and second reefing lines.

11. The parachute system according to claim 8 wherein the single reefing line cutter comprises a pyrotechnic cutter.

12. The parachute system according to claim 8 further including a line loop attached to the single reefing line cutter wherein the first ends of the first and second reefing lines are connected to the line loop and wherein the single reefing line cutter cuts the line loop when the single reefing line cutter is activated.

13. The parachute system according to claim 8 wherein the single reefing line cutter is sewn to the center line.

14. The parachute system according to claim 8 wherein the first and second predetermined locations are substantially diametrically positioned with respect to each other.

* * * * *